United States Patent
Patel et al.

(10) Patent No.: US 7,885,294 B2
(45) Date of Patent: Feb. 8, 2011

(54) SIGNALING COMPRESSION INFORMATION USING ROUTING PROTOCOLS

(75) Inventors: Keyur Patel, San Jose, CA (US); Abhay Roy, Cupertino, CA (US); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 11/844,119

(22) Filed: Aug. 23, 2007

(65) Prior Publication Data

US 2009/0052452 A1 Feb. 26, 2009

(51) Int. Cl.
*H04J 3/18* (2006.01)

(52) U.S. Cl. .................. 370/477; 370/202; 370/521; 370/386; 370/392; 379/88.1; 379/93.08; 708/203

(58) Field of Classification Search .......... 370/202, 370/386, 392, 477, 521; 379/88.1, 93.08; 381/106; 704/500–504; 708/203, 247; 709/247; 710/68; 386/109

See application file for complete search history.

(56) References Cited

U.S. PATENT DOCUMENTS

| | | | | |
|---|---|---|---|---|
| 5,131,016 A | * | 7/1992 | Broughton et al. | 375/240 |
| 5,293,379 A | * | 3/1994 | Carr | 370/474 |
| 5,592,512 A | * | 1/1997 | Spiess | 375/240 |
| 5,617,423 A | * | 4/1997 | Li et al. | 370/426 |
| 5,742,773 A | * | 4/1998 | Blomfield-Brown et al. | 709/228 |
| 5,761,438 A | * | 6/1998 | Sasaki | 709/247 |
| 5,845,243 A | * | 12/1998 | Smart et al. | 704/200.1 |
| 6,041,054 A | * | 3/2000 | Westberg | 370/389 |
| 6,314,095 B1 | * | 11/2001 | Loa | 370/352 |
| 6,421,734 B1 | * | 7/2002 | Nessett et al. | 709/247 |
| 6,512,764 B1 | * | 1/2003 | Carew et al. | 370/356 |

(Continued)

FOREIGN PATENT DOCUMENTS

WO   WO 2005086451 A1 *  9/2005

OTHER PUBLICATIONS

Reynolds, J., Postel, J., RFC 1700—Assigned Numbers, dated Oct. 1994, pp. 1-199, IETF, available at www.ietf.org/rfc/rfc1700.

(Continued)

*Primary Examiner*—Aung S Moe
*Assistant Examiner*—Benjamin Elliott
(74) *Attorney, Agent, or Firm*—Brinks Hofer Gilson & Lione

(57) ABSTRACT

An ability to compress packets is announced from a customer edge router (CE) to other CEs through a routing protocol packet. An announcement of that ability is received from another CE through a routing protocol packet. A compression technique is then matched. The CE receives compression information from the other CE in a routing protocol packet, and determines that a compression technique identified therein matches any compression technique the CE is programmed to use. The CE then flags packets transmitted from/received by the CE to be compressed/decompressed according to the matched compression technique. Alternatively, the CE may match by transmitting compression information identifying a compression technique to the another CE in a routing protocol packet; the another CE receives the routing protocol packet and determines that a compression technique identified in the compression information of the routing protocol packet matches any compression technique the another CE is programmed to use.

19 Claims, 13 Drawing Sheets

U.S. PATENT DOCUMENTS

| | | | | |
|---|---|---|---|---|
| 6,711,164 | B1* | 3/2004 | Le et al. | 370/392 |
| 6,751,209 | B1* | 6/2004 | Hamiti et al. | 370/349 |
| 6,898,181 | B1* | 5/2005 | Rasanen | 370/231 |
| 6,947,483 | B2* | 9/2005 | Engwer | 375/240 |
| 6,967,930 | B2* | 11/2005 | Burmeister et al. | 370/253 |
| 7,010,727 | B1* | 3/2006 | Stucker | 714/52 |
| 7,154,416 | B1* | 12/2006 | Savage | 341/51 |
| 7,154,889 | B1* | 12/2006 | Rekhter et al. | 370/392 |
| 7,185,091 | B2* | 2/2007 | Dorenbosch et al. | 709/224 |
| 7,301,947 | B2* | 11/2007 | Tourunen et al. | 370/392 |
| 7,342,902 | B2* | 3/2008 | Garakani et al. | 370/329 |
| 7,453,886 | B1* | 11/2008 | Allan | 370/395.5 |
| 7,558,873 | B1* | 7/2009 | Maufer | 709/237 |
| 7,616,649 | B2* | 11/2009 | Heiman et al. | 370/401 |
| 2001/0030963 | A1 | 10/2001 | Yoshimura et al. | 370/393 |
| 2002/0058474 | A1* | 5/2002 | Thompson et al. | 455/3.01 |
| 2002/0097701 | A1* | 7/2002 | Lupien et al. | 370/338 |
| 2002/0120458 | A1* | 8/2002 | Silfvast et al. | 704/500 |
| 2003/0225914 | A1* | 12/2003 | Gazier et al. | 709/247 |
| 2004/0081151 | A1 | 4/2004 | Greis et al. | 370/392 |
| 2004/0090989 | A1* | 5/2004 | Kobayashi | 370/469 |
| 2004/0117498 | A1* | 6/2004 | Hashimoto et al. | 709/230 |
| 2004/0125817 | A1* | 7/2004 | Miyazaki et al. | 370/411 |
| 2005/0041660 | A1 | 2/2005 | Pennec et al. | 370/389 |
| 2005/0055464 | A1 | 3/2005 | Weller | 709/247 |
| 2006/0031852 | A1* | 2/2006 | Chu et al. | 719/320 |
| 2006/0133265 | A1* | 6/2006 | Lee | 370/228 |
| 2006/0242157 | A1* | 10/2006 | McCuller | 707/10 |
| 2006/0262812 | A1* | 11/2006 | Liu et al. | 370/477 |
| 2007/0002850 | A1* | 1/2007 | Guichard et al. | 370/389 |
| 2007/0133406 | A1* | 6/2007 | Vasseur | 370/230 |
| 2007/0214275 | A1* | 9/2007 | Mirtorabi et al. | 709/230 |
| 2008/0056264 | A1* | 3/2008 | Ong | 370/392 |
| 2008/0267219 | A1* | 10/2008 | Christoffersson et al. | 370/477 |
| 2009/0052452 | A1* | 2/2009 | Patel et al. | 370/392 |

OTHER PUBLICATIONS

Friend, R., Monsour, R., RFC 2395—IP Payload Compression Using LZS, dated Dec. 1998, pp. 1-8, IETF, available at www.ietf.org/rfc/rfc2395.

Shacham, A., Monsour, R., Pereira, R., Thomas, M., RFC 3173—IP Payload Compression Protocol (IPComp), dated Sep. 2001, pp. 1-14, IETF, available at http://rfc.sunsite.dk/rfc/rfc3173.

Koren, T., Casner, S., Geevarghese, J., Thompson, B., Ruddy, P., RFC 3545—Enhanced Compressed RTP (CRTP) for Links with High Delay, Packet Loss and Reordering, dated Jul. 2003, pp. 1-23, IETF, available at http://tools.ietf.org.

Supplementary European Search Report, dated Jun. 15, 2009, pp. 1-6, European Patent Application No. 06774262.7-1249/1897297, European Patent Office, The Netherlands.

Berger, J., Jeffords, J., MPLS/IP Header Compression, dated Jul. 2000, pp. 1-14, draft-ietf-mpls-hdr-comp-00.txt, IETF.

Thompson, B., Koren, T., Wing, D., Tunneling Multiplexed Compressed RTP ("TCRTP"), dated Sep. 2004, pp. 1-22, draft-ietf-avt-tcrtp-08.txt, IETF.

Ash, J., Goode, B., Hand, J., Zhang, R., Requirements for Header Compression over MPLS, dated Jun. 2004, pp. 1-17, draft-ietf-avt-hc-mpls-reqs-03.txt, IETF.

Ash, J., Goode, B., Hand, J., Swallow, G., Zhang, R., Header Compression over MPLS, dated Mar. 2005, pp. 1-13, draft-ietf-avt-hc-mpls-reqs-03.txt, IETF.

* cited by examiner

401 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

402 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

403 MATCH A COMPRESSION TECHNIQUE WITH THE ANOTHER CUSTOMER EDGE ROUTER

404 RECEIVE COMPRESSION INFORMATION FROM THE ANOTHER CUSTOMER EDGE ROUTER IN A ROUTING PROTOCOL PACKET

407 RECEIVE COMPRESSION INFORMATION FROM THE ANOTHER CUSTOMER EDGE ROUTER IN A ROUTING PROTOCOL PACKET, WHEREIN THE COMPRESSION INFORMATION IDENTIFIES A PLURALITY OF COMPRESSION TECHNIQUES

405 DETERMINE THAT THE COMPRESSION TECHNIQUE IDENTIFIED IN THE COMPRESSION INFORMATION MATCHES ANY COMPRESSION TECHNIQUE THE CUSTOMER EDGE ROUTER IS PROGRAMMED TO USE

408 DETERMINE THAT ANY TWO OR MORE OF THE IDENTIFIED PLURALITY OF COMPRESSION TECHNIQUES MATCH ANY COMPRESSION TECHNIQUES THE CUSTOMER EDGE ROUTER IS PROGRAMMED TO USE

409 SELECT A MATCHED COMPRESSION TECHNIQUE FROM ANY OF THE MATCHED COMPRESSION TECHNIQUES

406 FLAG PACKETS TRANSMITTED FROM AND RECEIVED BY THE CUSTOMER EDGE ROUTER TO BE COMPRESSED AND DECOMPRESSED ACCORDING TO THE SELECTED MATCHED COMPRESSION TECHNIQUE

FIG. 4

501 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

↓

502 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

↓

503 MATCH A COMPRESSION TECHNIQUE WITH THE ANOTHER CUSTOMER EDGE ROUTER

504 TRANSMIT COMPRESSION INFORMATION TO THE ANOTHER CUSTOMER EDGE ROUTER IN A ROUTING PROTOCOL PACKET, WHEREIN THE COMPRESSION INFORMATION IDENTIFIES A COMPRESSION TECHNIQUE, AND WHEREIN THE ANOTHER CUSTOMER EDGE ROUTER RECEIVES THE ROUTING PROTOCOL PACKET AND DETERMINES THAT A COMPRESSION TECHNIQUE IDENTIFIED IN THE COMPRESSION INFORMATION OF THE ROUTING PROTOCOL PACKET MATCHES ANY COMPRESSION TECHNIQUE THE ANOTHER CUSTOMER EDGE ROUTER IS PROGRAMMED TO USE

↓

506 FLAG PACKETS TRANSMITTED FROM AND RECEIVED BY THE CUSTOMER EDGE ROUTER TO BE COMPRESSED AND DECOMPRESSED ACCORDING TO THE MATCHED COMPRESSION TECHNIQUE

FIG. 5

601 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

▼

602 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

▼

603 MATCH A COMPRESSION TECHNIQUE WITH THE ANOTHER CUSTOMER EDGE ROUTER

604 TRANSMIT COMPRESSION INFORMATION TO THE ANOTHER CUSTOMER EDGE ROUTER IN A ROUTING PROTOCOL PACKET, WHEREIN THE COMPRESSION INFORMATION IDENTIFIES A PLURALITY OF COMPRESSION TECHNIQUES, AND WHEREIN THE ANOTHER CUSTOMER EDGE ROUTER RECEIVES THE ROUTING PROTOCOL PACKET, DETERMINES THAT ANY OF THE PLURALITY OF COMPRESSION TECHNIQUES IDENTIFIED IN THE COMPRESSION INFORMATION OF THE ROUTING PROTOCOL PACKET MATCHES ANY COMPRESSION TECHNIQUE THE ANOTHER CUSTOMER EDGE ROUTER IS PROGRAMMED TO USE, AND SELECTS A MATCHED COMPRESSION TECHNIQUE FROM ANY OF THE MATCHED COMPRESSION TECHNIQUES

▼

606 FLAG PACKETS TRANSMITTED FROM AND RECEIVED BY THE CUSTOMER EDGE ROUTER TO BE COMPRESSED AND DECOMPRESSED ACCORDING TO THE SELECTED MATCHED COMPRESSION TECHNIQUE

FIG. 6

901 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

902 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

903 MATCH A COMPRESSION TECHNIQUE WITH THE ANOTHER CUSTOMER EDGE ROUTER

904 TRANSMIT COMPRESSION INFORMATION TO THE ANOTHER CUSTOMER EDGE ROUTER IN A ROUTING PROTOCOL PACKET, WHEREIN THE COMPRESSION INFORMATION IDENTIFIES A COMPRESSION TECHNIQUE, AND WHEREIN THE ANOTHER CUSTOMER EDGE ROUTER RECEIVES THE ROUTING PROTOCOL PACKET AND DETERMINES THAT A COMPRESSION TECHNIQUE IDENTIFIED IN THE COMPRESSION INFORMATION OF THE ROUTING PROTOCOL PACKET MATCHES ANY COMPRESSION TECHNIQUE THE ANOTHER CUSTOMER EDGE ROUTER IS PROGRAMMED TO USE

906 FLAG PACKETS TRANSMITTED FROM AND RECEIVED BY THE CUSTOMER EDGE ROUTER TO BE COMPRESSED AND DECOMPRESSED ACCORDING TO THE MATCHED COMPRESSION TECHNIQUE

908 RECEIVE A MESSAGE FROM THE ANOTHER CUSTOMER EDGE ROUTER INDICATING THAT A CHANGE IN COMPRESSION TECHNIQUES IS NEEDED

909 IDENTIFY A NEW MATCHED COMPRESSION TECHNIQUE WITH THE ANOTHER CUSTOMER EDGE ROUTER BY REPEATING THE STEP OF MATCHING

910 FLAG PACKETS TRANSMITTED FROM AND RECEIVED BY THE CUSTOMER EDGE ROUTER TO BE COMPRESSED AND DECOMPRESSED ACCORDING TO THE IDENTIFIED NEW MATCHED COMPRESSION TECHNIQUE

FIG. 9

1101 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

1102 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

1103 MATCH A COMPRESSION TECHNIQUE WITH THE ANOTHER CUSTOMER EDGE ROUTER

1104 RECEIVE COMPRESSION INFORMATION FROM THE ANOTHER CUSTOMER EDGE ROUTER IN A ROUTING PROTOCOL PACKET

1105 DETERMINE THAT THE COMPRESSION TECHNIQUE IDENTIFIED IN THE COMPRESSION INFORMATION MATCHES ANY COMPRESSION TECHNIQUE THE CUSTOMER EDGE ROUTER IS PROGRAMMED TO USE

1106 FLAG PACKETS TRANSMITTED FROM AND RECEIVED BY THE CUSTOMER EDGE ROUTER TO BE COMPRESSED AND DECOMPRESSED ACCORDING TO THE MATCHED COMPRESSION TECHNIQUE

1107 THE CUSTOMER EDGE ROUTER COMMUNICATES WITH OTHER CUSTOMER EDGE ROUTERS THROUGH A PROVIDER EDGE ROUTER AND A PROVIDER NETWORK, DETECT A CE-PE ROUTING PROTOCOL USED FOR TRANSMISSIONS BETWEEN THE CUSTOMER EDGE ROUTER AND A CORRESPONDING PROVIDER EDGE ROUTER

1108 IF THE DETECTED CE-PE ROUTING PROTOCOL DIFFERS FROM A PE-PE ROUTING PROTOCOL USED FOR TRANSMISSIONS BETWEEN PROVIDER EDGE ROUTERS, EXTEND ANY COMPRESSION INFORMATION FROM THE CE-PE ROUTING PROTOCOL FOR USE BY THE PE-PE ROUTING PROTOCOL AND EXTRACT ANY COMPRESSION INFORMATION FROM THE PE-PE ROUTING PROTOCOL FOR USE BY THE CE-PE ROUTING PROTOCOL

FIG. 11

1201 ANNOUNCE, FROM A CUSTOMER EDGE ROUTER TO OTHER CUSTOMER EDGE ROUTERS IN A NETWORK, AN ABILITY TO COMPRESS PACKETS, WHEREIN THE ABILITY IS REPRESENTED BY AN ADDITION TO A ROUTING PROTOCOL PACKET

1202 RECEIVE AN ANNOUNCEMENT OF AN ABILITY TO COMPRESS PACKETS FROM ANOTHER CUSTOMER EDGE ROUTER IN THE NETWORK, WHEREIN THE ANNOUNCEMENT IS REPRESENTED BY AN ADDITION TO A ROUTING PROTOCOL PACKET

1203 MATCH A COMPRESSION TECHNIQUE WITH THE ANOTHER CUSTOMER EDGE ROUTER

1204 RECEIVE COMPRESSION INFORMATION FROM THE ANOTHER CUSTOMER EDGE ROUTER IN A ROUTING PROTOCOL PACKET

1205 DETERMINE THAT THE COMPRESSION TECHNIQUE IDENTIFIED IN THE COMPRESSION INFORMATION MATCHES ANY COMPRESSION TECHNIQUE THE CUSTOMER EDGE ROUTER IS PROGRAMMED TO USE

1206 FLAG PACKETS TRANSMITTED FROM AND RECEIVED BY THE CUSTOMER EDGE ROUTER TO BE COMPRESSED AND DECOMPRESSED ACCORDING TO THE MATCHED COMPRESSION TECHNIQUE

1207 COMPRESSION INFORMATION IDENTIFIES A COMPRESSION TECHNIQUE AND A CLASS OF PACKETS TO WHICH THE COMPRESSION TECHNIQUE IS TO BE APPLIED, FLAG PACKETS TRANSMITTED FROM AND RECEIVED BY THE CUSTOMER EDGE ROUTER, THAT ARE IN THE IDENTIFIED CLASS OF PACKETS, TO BE COMPRESSED AND DECOMPRESSED ACCORDING TO THE MATCHED COMPRESSION TECHNIQUE

FIG. 12

```
+------------------------------------------------+
| Address Family Identifier (2 octets)           |
+------------------------------------------------+
| Reserved (1 octet)                             |
+------------------------------------------------+
| Subsequent Address Family Identifier (1 octet) |
+------------------------------------------------+
```

FIG. 13

```
+------------------------------------------------+
| Type = CAS-TLV (TBD) 2 octets                  |
+------------------------------------------------+
| Length 2 octets                                |
+------------------------------------------------+
| Compression Algorithms Supported 4 octets      |
+------------------------------------------------+
```

FIG. 14

SIGNALING COMPRESSION INFORMATION USING ROUTING PROTOCOLS

TECHNICAL FIELD

The present disclosure relates generally to networks, and more particularly to routing protocols used by networks.

BACKGROUND

Businesses, universities, and other entities typically deploy networks within their organization, to assist in the transfer of data and for communications purposes such as e-mail. The efficacy of such internal networks, which may include local area networks (LANs) that are primarily located in one geographic location, as well as wide area networks (WANs) that may be spread across a number of geographic locations, are obviously improved by being connected to still other networks, such as the Internet, as well as each other. One configuration for connecting, for example, a WAN for a company's New York City office to a WAN for the same company's Los Angeles office, is to connect the two WANs to a so-called provider network. The routers that connect the WANs with the provider network are commonly referred to as edge routers. Those on the company-owned WAN side of the network are called customer edge routers, while those on the provider-owned side of the network are known as provider edge routers. Communications from the New York City office WAN thus travel from a node on that WAN to a customer edge router, than to a provider edge router on one side of the provider network, over the provider network to a provider edge router on the other side of the provider network, and then to a customer edge router in the Los Angeles office WAN, and finally to the destination node on the Los Angeles office WAN. Depending on the size of the networks, vast amounts of data may thus be communicated between WANs.

Numerous types of wide area network (WAN) accelerators have been defined to help customer edge routers (CEs) achieve maximum throughput out of their WAN links. WAN accelerators require the use of proprietary mechanisms or manual configuration by an operator of all endpoints to achieve the desired throughput by selecting the same compression technique to be used by the accelerator. By compressing the data, customer edge routers are able to send more data over the same amount of bandwidth compared with uncompressed data, which takes up more networking resources. Thus, network performance may be improved.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates a flowchart of a procedure preformed by the customer edge router depicted in FIG. 1 when selecting a compression technique signaled through a routing protocol.

FIG. 5 illustrates a flowchart of a procedure preformed by the customer edge router depicted in FIG. 1 when signaling compression information through a routing protocol by transmitting compression information.

FIG. 6 illustrates a flowchart of a procedure performed by the customer edge router depicted in FIG. 1 when selected a compression technique signaled through a routing protocol.

FIGS. 7-10 illustrate flowcharts of procedures preformed by the customer edge router depicted in FIG. 1 when a matched compression technique signaled through a routing protocol is no longer being used, and a new compression technique must be signaled, with the same or another customer edge router.

FIG. 11 illustrates a flowchart of a procedure preformed by the customer edge router depicted in FIG. 1 when the routing protocol used between provider edge routers differs from the routing protocol used between a customer edge router and a provider edge router.

FIG. 12 illustrates a flowchart of a procedure preformed by the customer edge router depicted in FIG. 1 when acting only on a class of packets that is identified through a routing protocol.

FIG. 13 illustrates an example structure of a Border Gateway Protocol (BGP) Compression Capability as described herein.

FIG. 14 illustrates an example structure of a Compression Algorithms Supported Type Length Value (CAS-TLV) as described herein.

DESCRIPTION OF EXAMPLE EMBODIMENTS

Overview

Figure 1:
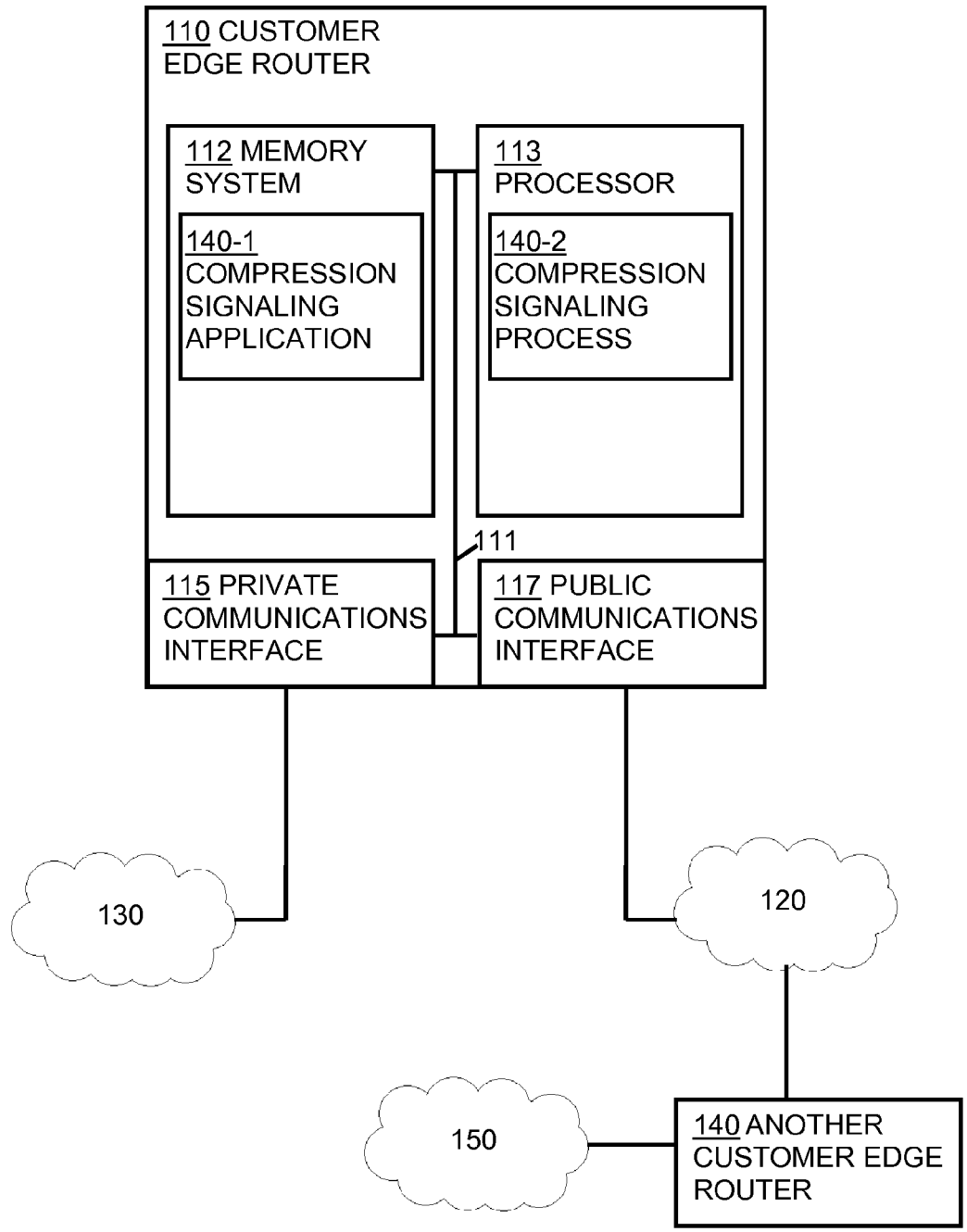
FIG. 1 illustrates an example router architecture for a customer edge router according to one embodiment disclosed herein.

In an embodiment there is provided a method of signaling compression information between customer edge routers in a network. The method includes announcing (for example, transmitting an announcement) an ability to compress packets. The ability is represented by an addition to a routing protocol packet. As an example, the customer edge router may include additional announcement information in a packet that indicates this ability. The announcement may be transmitted from a customer edge router to other customer edge routers. The method also includes receiving an announcement of an ability to compress packets from another customer edge router in the network. The announcement is represented by an addition to a routing protocol packet. Examples of these additions are described in greater detail below with respect to particular routing protocols. The customer edge router then matches a compression technique with another customer edge router. The method includes receiving compression information from the another customer edge router in a routing protocol packet. The compression information may identify, for example, a particular compression technique that the another customer edge router is capable of using. The method then includes determining that the compression technique identified in the compression information matches any compression technique the customer edge router is programmed to use. Packets transmitted from and received by the customer edge router are flagged to be compressed and decompressed according to the matched compression technique.

In a related embodiment, receiving may include receiving compression information from the another customer edge router in a routing protocol packet, wherein the compression information identifies a plurality of compression techniques, and determining may include determining that any two or more of the identified plurality of compression techniques match any compression techniques the customer edge router is programmed to use; and selecting a matched compression technique from any of the matched compression techniques.

In another related embodiment, matching may include transmitting compression information to the another customer edge router in a routing protocol packet, wherein the compression information identifies a compression technique, and wherein the another customer edge router receives the routing protocol packet and determines that a compression technique identified in the compression information of the routing protocol packet matches any compression technique the another customer edge router is programmed to use.

In a further related embodiment, transmitting may include transmitting compression information to the another customer edge router in a routing protocol packet, wherein the compression information identifies a plurality of compression techniques, and wherein the another customer edge router receives the routing protocol packet, determines that any of the plurality of compression techniques identified in the compression information of the routing protocol packet matches any compression technique the another customer edge router is programmed to use, and selects a matched compression technique from any of the matched compression techniques.

In another further related embodiment, the method may include receiving a message from the another customer edge router indicating that a change in compression techniques is needed; identifying a new matched compression technique with the another customer edge router by repeating the step of matching; and flagging packets transmitted from and received by the customer edge router to be compressed and decompressed according to the identified new matched compression technique.

In still another further related embodiment, the method may include failing to identify a new matching compression technique; in response, locating a second customer edge router with an announced capability to compress packets, wherein the second customer edge router and the another customer edge router are connected to the same local network; conducting a new matching with the second customer edge router by repeating the step of matching; and flagging packets transmitted from and received by the customer edge router to be compressed and decompressed according to the matched compression technique.

In another related embodiment, the method may include determining that the customer edge router is no longer able to use the matched compression technique; in response, sending the another customer edge router a message indicating that a change in compression techniques is needed; identifying a new matched compression technique with the another customer edge router by repeating the step of matching; and flagging packets transmitted from and received by the customer edge router to be compressed and decompressed according to the identified new matched compression technique. In a further related embodiment, the method may include failing to identify a new matching compression technique; in response, locating a second customer edge router with an announced capability to compress packets, wherein the second customer edge router and the another customer edge router are connected to the same local network; conducting a new matching with the second customer edge router by repeating the step of matching; and flagging packets transmitted from and received by the customer edge router to be compressed and decompressed according to the matched compression technique.

In another related embodiment, wherein the customer edge router communicates with other customer edge routers through a provider edge router and a provider network, the method may include detecting a customer edge-provider edge routing protocol used for transmissions between the customer edge router and a corresponding provider edge router; and if the detected customer edge-provider edge routing protocol differs from a provider edge-provider edge routing protocol used for transmissions between provider edge routers, extending any compression information from the customer edge-provider edge routing protocol for use by the provider edge-provider edge routing protocol and extracting any compression information from the provider edge-provider edge routing protocol for use by the customer edge-provider edge routing protocol.

In still another related embodiment, wherein compression information identifies a compression technique and a class of packets to which the compression technique is to be applied, flagging may include, upon completion of the negotiation, flagging packets transmitted from and received by the customer edge router, that are in the identified class of packets, to be compressed and decompressed according to the matched compression technique.

Arrangements of the invention involving a computer program product are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone. It is to be understood that the embodiments of the invention may be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

DETAILED DESCRIPTION

Embodiments of the invention describe a mechanism to carry compression information along with other routing information between different customer edge routers of any given enterprise. Though embodiments described herein reference customer edge routers, those skilled in the art will recognize that embodiments may easily be extended into much broader spaces where compression is used, such as for mobile phones that access a network via General Packet Radio Service (GPRS) or Wireless Access Protocol (WAP).

Embodiments of the invention describe how to create and exchange compression information between customer edge routers and thereby allow customer edge routers to compress traffic and optimize their Wide Area Network (WAN) links whenever forwarding their data to the destinations supporting such a mechanism. With the compression information exchanged between customer edge routers, each of the customer edge routers would know at the route level which compression algorithm to apply. This allows customer edge routers to compress the data going towards their virtual private network (VPN) sites or to any destinations that have announced compression support that corresponds to the type of compression the customer edge router itself supports. Thus, compressing data over WAN links may result in better throughput of the WAN links, at least two times the data obtained from using the PPP compression algorithm, which may easily be incorporated into embodiments described herein. Further, automatic signaling allows Internet Service Providers (ISPs) to sell this as a service for their managed customer edge routers, and there is no or very little configuration support without risking black-holing data.

In one embodiment, a new Border Gateway Protocol (BGP) capability, known as BGP Compression Capability, and a new BGP attribute, known as BGP Compression Attribute, are defined. BGP speakers announce a BGP Compression Attribute to the speakers that support the BGP Compression Capability. The BGP Compression Attribute carries compression algorithm information about the originating speaker. The details of the BGP Compression Capability, Attribute and its operation are described in greater detail below. In an alternate embodiment, a new Type-Length-Value (TLV) is defined for the Open Shortest Path First (OSPF) protocol. This new TLV is known as a Compression Algorithms Supported Type Length Value (CAS-TLV) and is added to at least OSPF Hello packets. Similar to the BGP Compression Capability and BGP Compression Attribute, the CAS-TLV identifies both an ability to compress as well as compression information about an originating speaker.

More particularly, FIG. 1 is a block diagram illustrating an example architecture of a customer edge router 110 that executes, runs, interprets, operates or otherwise performs a compression signaling application 140-1 and a compression signaling process 140-2 suitable for use in explaining example configurations disclosed herein. As shown in this example, the customer edge router 110 includes an interconnection mechanism 111 such as a data bus or other circuitry that couples a memory system 112, a processor 113, a public communications interface 115 and a private communications interface 11 7. The public communications interface 115 and the private communications interface 117 enable the customer edge router 110 to communicate with other networks (such as the networks 120, 130, and 150 shown in FIG. 1) and with other customer edge routers (such as another customer edge router 140 shown in FIG. 1). An example network configuration including the customer edge router 110 is shown in greater detail in FIG. 2, and is described further below.

The memory system 112 is any type of computer readable medium and in this example is encoded with a compression signaling application 140-1 that includes a compression signaling process 140-2. The compression signaling application 140-1 may be embodied as software code such as data and/or logic instructions (e.g., code stored in the memory system 112 or on another computer readable medium such as a removable disk) that supports processing functionality according to different embodiments described herein. During operation of the customer edge router 110, the processor 113 accesses the memory system 112 via the interconnection mechanism 111 in order to launch, run, execute, interpret or otherwise perform the logic instructions of the compression signaling application 140-1. Execution of the compression signaling application 140-1 in this manner produces processing functionality in a compression signaling process 140-2. In other words, the compression signaling process 140-2 represents one or more portions or runtime instances of the compression signaling application 140-1 performing or executing within or upon the processor 113 in the customer edge router 110 at runtime.

It is noted that example configurations disclosed herein include the compression signaling application 140-1 itself including the compression signaling process 140-2 (i.e., in the form of un-executed or non-performing logic instructions and/or data). The compression signaling application 140-1 may be stored on a computer readable medium (such as a floppy disk), hard disk, electronic, magnetic, optical or other computer readable medium. The compression signaling application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the compression signaling application 140-1 in the processor 113 as the compression signaling process 140-2. Those skilled in the art will understand that the customer edge router 110 may include other processes and/or software and hardware components, such as an operating system not shown in this example.

Figure 2:
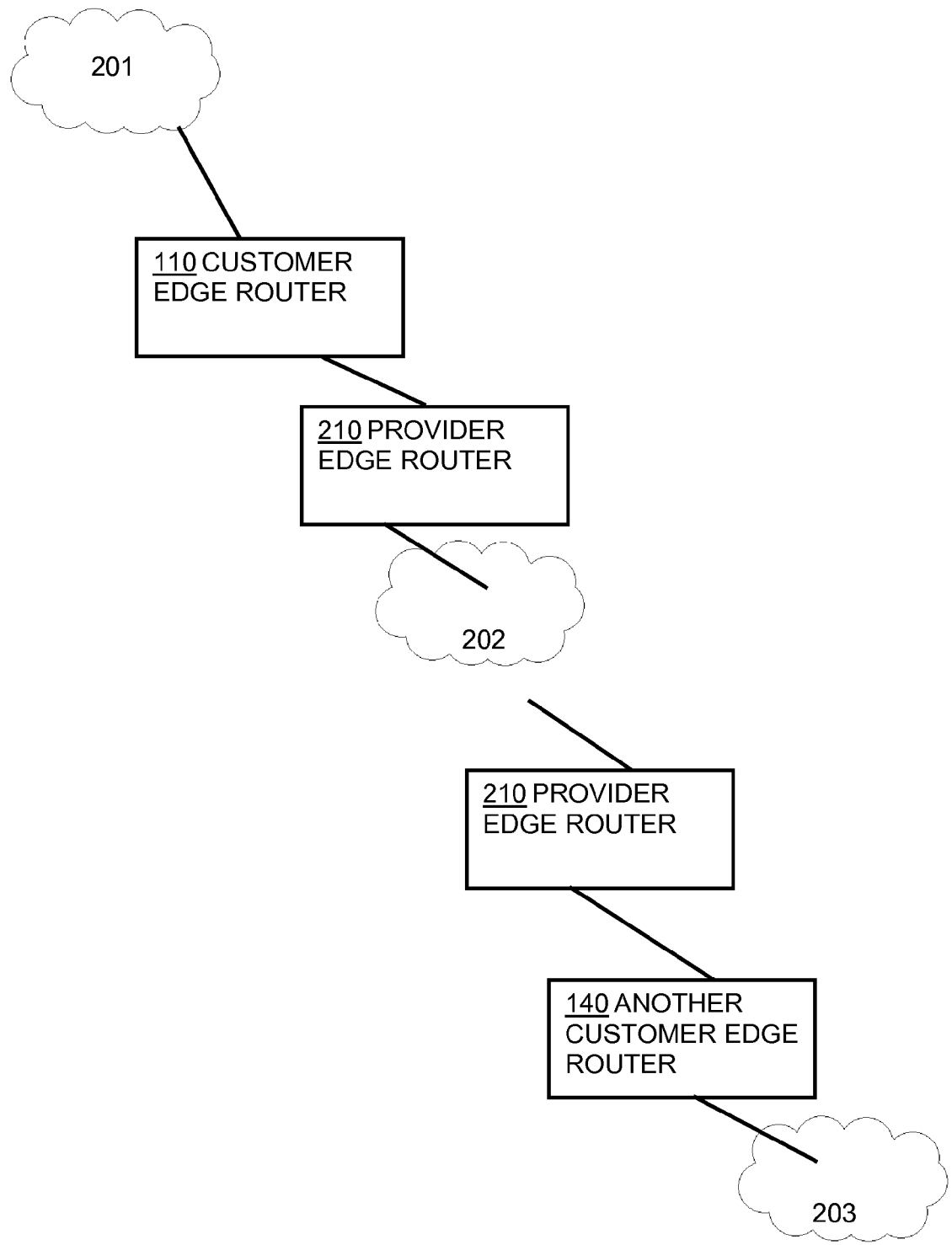
FIG. 2 illustrates an example network including customer edge routers as depicted in FIG. 1.

FIG. 2 illustrates an example configuration of a network that may employ a customer edge router, such as the customer edge router 110 described above in regards to FIG. 1. The customer edge router 110 is connected to a private network 201, which may be but is not limited to a local area network (LAN) of a company's New York City office. The customer edge router 110 is also connected to a provider edge router 210. The provider edge router 210 is, in turn, connected to a network 202, which may be a network that is particular to the provider, or may be a public network such as the public Internet. Another customer edge router 140, which may be connected to a network 203, such as but not limited to a LAN of the same company's Los Angeles office for example, is also needed. The another customer edge router 140 is also connected to a provider edge router 210, which in turn is connected to the network 202. Traffic going back and forth between the New York City office's LAN 201 and the Los Angeles office's LAN 203 must first travel over the respective customer edge routers 110 and 140 and their respective provider edge routers 210, as well as the network 203. Various routing protocols, such as Border Gateway Protocol (BGP) and Open Shortest Path First (OSPF), as well as other proprietary protocols, may be used to handle routing along the described network path. Note that the exact configuration of a network including one or more customer edge routers 110 may differ from that shown in FIG. 2, which is provided solely as an example.

A number of flowcharts of the presently disclosed method are illustrated in FIGS. 3-12. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 3-12 illustrate flowcharts of various embodiments as performed by the compression signaling application 140-1 when executing as the compression signaling process 140-2.

Figure 3:
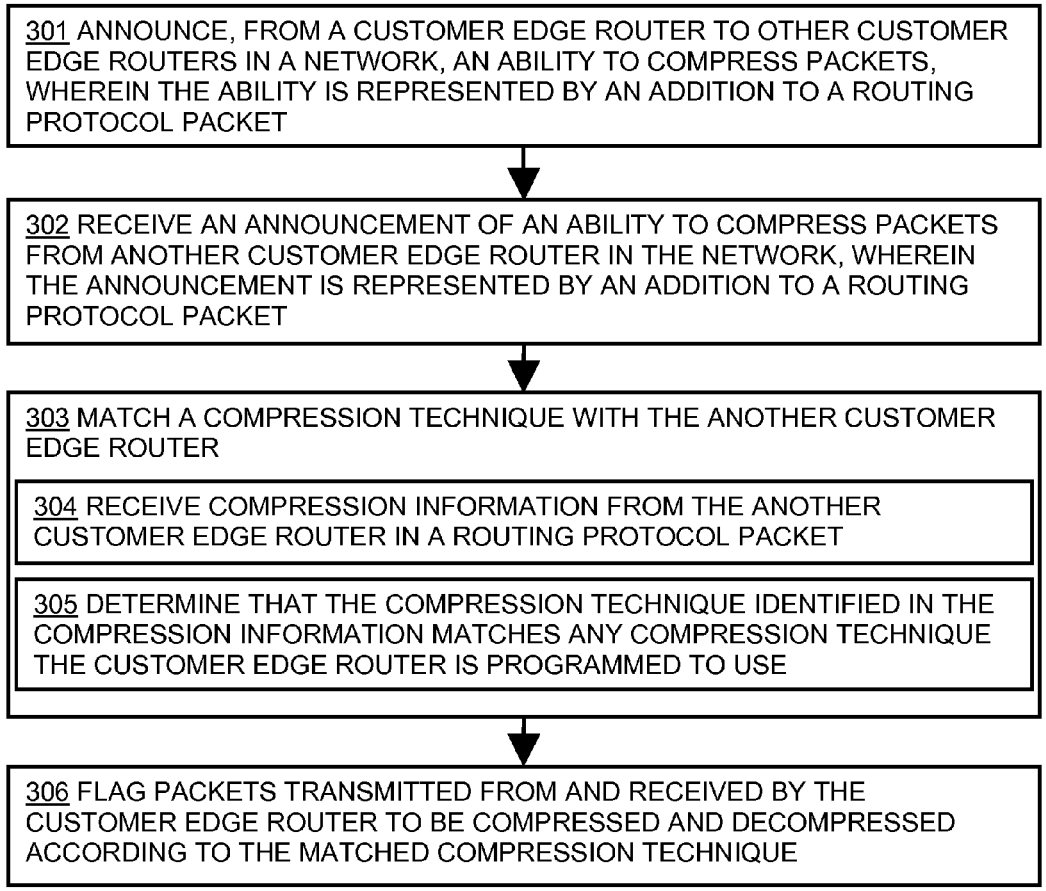
FIG. 3 illustrates a flowchart of a procedure preformed by the customer edge router depicted in FIG. 1 when signaling compression information through a routing protocol.

In FIG. 3, a customer edge router, such as the customer edge router 110 shown in FIG. 1, signals compression information to another customer edge router, such as the another customer edge router 140 shown in FIG. 1. The compression signaling application 140-1, executing as the compression signaling process 140-2, allows the customer edge router 110 to announce, to other customer edge routers, an ability to compress packets, step 301. The ability to compress packets is announced by adding data to a routing protocol packet, such that the ability is represented by the added data. For example, if the routing protocol used by the customer edge router 110 to communicate with a corresponding provider edge router, and ultimately with the another customer edge router 140, is Border Gateway Protocol (BGP), than the compression signaling process 140-2 adds data known as a BGP Compression Capability (BGP-CAP) to a BGP packet. The compression signaling process 140-2 may add the BGP Compression Capability to a BGP packet if the customer edge router 110 is willing to receive compressed packets from another customer edge router, or if the customer edge router 110 would like to send compressed packets to another customer edge router.

The BGP Compression Capability is defined as follows, with an example structure shown in FIG. 13. The capability code is an identifier for the data. In an embodiment, this identifier is assigned by Internet Assigned Numbers Authority. In an embodiment, the length of the capability is variable, and the capability value may be one or more of the following: an Address Family Identifier (AFI) or a Subsequent Address Family Identifier (SAFI). The AFI field carries the identity of the network layer protocol associated with the network address that follows. Presently defined values for the AFI field are specified in RFC 1700, which defines various parameters (i.e., numerical and alphabetical values) used in protocols. The SAFI field provides additional information about the type of the network layer reachability information carried in the compression information that is sent as described below.

Alternatively, if the customer edge router 110 uses Open Shortest Path First (OSPF) to communicate with a provider edge router, the compression signaling process 140-2 will add a Compression Algorithms Supported Type Length Value (CAS-TLV) to an OSPF packet. This is a particular type of TLV added to an OSPF packets, an example of which is defined here. However, the same functionality may be achieved by using a TLV with a different name, structure, or both. The CAS-TLV is defined in the link-local signaling [LLS] block of Hello packets, and an example structure of the CAS-TLV is shown in FIG. 14. The type field may be either from a private number space, or if standardized a later time, may be allocated from the Internet Assigned Numbers Authority (IANA) assigned number space. The length of the CAS-TLV is four octets. The CAS-TLV also includes compression information, as is described in greater detail below.

Other routing protocols, such as proprietary routing protocols created and used by Cisco Systems, Inc. and other companies, may be similarly modified to transmit an announcement of an ability to compress data and to identify techniques to compress data. Such modifications may depend on the particulars of the routing protocols, and may be performed with ease by one of ordinary skill in the art. Example descriptions given below with respect to BGP and OSPF are meant solely as examples, and are not limiting in any way.

The customer edge router 110, through the compression signaling process 140-2, then receives an announcement of an ability to compress packets from another customer edge router in the network, step 302. As with the ability announced by the customer edge router 110, the received announcement is also represented by an addition to a routing protocol packet, such as those described above. In the case of BGP, the received announcement must contain the Compression Capability described above, or the customer edge router 110 will not transmit compressed packets or receive compressed packets from the another customer edge router. Similarly, in the case of OSPF, the received announcement must contain the CAS-TLV in the received Hello packet, or else data transmitted between that customer edge router and the customer edge router 110 will not be compressed. It is possible for a customer edge router to decide, while in the course of transmitting and received compressed packets, to no longer do so. In this situation, the compression signaling process 140-2 of that customer edge router may remove the CAS-TLV from its Hello packets, for OSPF, or cease announcing the BGP Compression Capability, for BGP, or otherwise communicate the decision, as described in greater detail below.

Further, any number of customer edge routers may announce an ability to compress packets, and similarly, any number of announcements of an ability to compress packets may be received by a single customer edge router. For example, each local area network of a particular office of a company may have a plurality of customer edge routers. All of the plurality of customer edge routers, or any subset of the plurality, may choose to send announcements to some subset, or all, of a plurality of customer edge routers located at the edge of a local area network of another office for the same company. Each customer edge router that receives multiple announcements will need to select a corresponding other customer edge router before proceeding to attempt to match the type of compression that will be used for transmission of packets between those customer edge routers.

The compression signaling process 140-2 next matches a compression technique with whatever another customer edge router the customer edge router 110 decides to attempt to match with, step 303. There are two scenarios for how this matching will occur, one of which is illustrated by the flowchart shown in FIG. 3. The other scenario is illustrated in the flowchart shown in FIG. 5, and is discussed in greater detail below. The two scenarios are based on whether the customer edge router 110 or the another customer edge router initiates the matching through its compression signaling process 140-2.

In the situation where the another customer edge router initiates the matching process, the compression signaling process 140-2 performs as follows (as shown in FIG. 3). First, the compression signaling process 140-2 receives compression information from the another customer edge router in a routing protocol packet, step 304. Then, the compression signaling process 140-2 determines that the compression technique identified in the compression information matches any compression technique the customer edge router is programmed to use, step 305.

A compression technique, as described above, may be any type of compression algorithm that a customer edge router, such as the customer edge router 110, is able to use to compress and decompress data. Depending on the type of routing protocol used, the compression information may vary in form, but will always identity at least one compression technique. For example, in one embodiment, for BGP, the compression information takes the form of a new BGP attribute called the BGP Compression attribute. In one embodiment, this attribute may include a transitive optional BGP path attribute, with a particular Type Code, such as but not limited to XXXX. The BGP Compression attribute may have a fixed length of 4 octets. Each bit in an octet may represent a well-known type of compression algorithm defined. In one embodiment, the value types are defined as follows: 0x00000000-0x0000ffff, which requires Internet Assigned Numbers Authority allocation; 0x0000ffff-0xffffffff, which is private allocation space that may be used, for example but not limited to, in any way according to the needs of the user; 1 IP Compression Protocol (described in detail in RFC 3545); 2 IP Payload Compression Protocol (described in detail in RFC 3173); 4 IP Payload Compression Using LZS (described in detail in RFC 2395). Of course, this allocation is merely one of many ways in which compression algorithms may be identified. Any allocation is possible, as long as the allocation is usable by BGP. Further, other compression algorithms may be included in the allocation.

To perform the match, the compression signaling process 140-2 for the initiating customer edge router announces, for example, the above-defined BGP Compression attribute to the other customer edge router that also announced an ability to compress packets. As the attribute is optionally transitive, any router that uses BGP and receives such an attribute is forced to silently forward it to its neighbors. Upon receiving the BGP Compression attribute, the other customer edge router tries to match the received Compression algorithms defined/set in the BGP Compression attribute with the compression technique(s)/algorithm(s) it is able to support. If the match results in a no-match, then the compression attribute is silently ignored. If the match returns with a successful match, the another customer edge router installs that compression technique along with the route in the forwarding information base (FIB)/Cisco Express Forwarding (CEF) table.

Alternatively, if the routing protocol used is OSPF, the CAS-TLV transmitted by the compression signaling process 140-2 will define the compression algorithm(s)/technique(s) supported by the initiating customer edge router, in a bitfield of, for example, four octets. Each bit may represent a well-known compression algorithm. Such compression algorithms may include those described above with regards to BGP, and similarly, any identified compression algorithms may be allocated as described above with regards to BGP or in any other way that is compatible with OSPF. OSPF will send a CAS-TLV in Hello packets, which helps in capability discovery among peers (i.e., other customer edge routers). If the CAS-TLV is not present, the compression signaling process 140-2 presumes that the peer does not support any compression algorithms. As further packets are transmitted over time, the compression signaling process will monitor the TLV to determine whether it has changed in any way. If the TLV has not changed, the compression signaling process 140-2 takes no action. However, if at any point the CAS-TLV has changed, which includes situations where the CAS-TLV was not present before, or was present before but is not present now, the compression signaling process 140-2 attempts to determine a common compression algorithm. A preference may be given to keep using the current compression algorithm, if possible. If the compression signaling process 140-2 selects a compression algorithm that is different than the one in use before, including situations when there was no prior compression, or there was compression but no compression is needed now, a routing table update is triggered. The route update will cause the compression signaling process 140-2 to re-install all routes via this peer (customer edge router) with the appropriate algorithm information.

Finally, once a match is determined, the compression signaling process 140-2 flags packets transmitted from and received by the customer edge router 110 to be compressed and decompressed according to the matched compression technique, step 306. Thus, whenever a customer edge router announces its site's routes via routing protocols such as but not limited to BGP/OSPF/EIGRP, the customer edge router may set a compression bit in a routing table on those routes that belong to its own site. For example, when BGP is the routing protocol used between a provider edge router and a customer edge router, a compression bit is set in the routing table (or its equivalent) on all the Interior Gateway Protocol (IGP) routes that are redistributed into BGP. BGP would provide a handler to modify all such IGP routes in the forwarding information base (FIB) of the customer edge router with a bit that signals the FIB to perform de-compression on a per route basis. That way, any received traffic that is compressed may be signaled to be de-compressed on a per route basis at the customer edge router and then forwarded as native traffic. A similar mechanism may be extended for OSPF and other Interior Gateway Protocols where internal routes in a routing table may be modified with a bit that signals a FIB to perform de-compression on a per route basis.

With routes marked in a routing table with compressed and decompressed bits, any data traffic may be compressed and decompressed with the information provided by routing protocols. Data packets are compressed whenever the routes in FIB (or routing table or other equivalent structure) are marked with the compress bits and are uncompressed at the incoming customer edge router where the routes are marked with uncompress bits. All the data packets that are received uncompressed may be forwarded straight as native packets without performing de-compression.

In FIG. 4, the compression signaling process 140-2 selects a particular compression technique that is signaled through a routing protocol. In other words, when a customer edge router announces an ability to compression data through a routing protocol packet, the customer edge router also identifies a number of different compression techniques that it is able to use to compress data. When two customer edge routers match a compression technique, one is selected from the available number of techniques.

Through its compression signaling process 140-2, the customer edge router 110 announces an ability to compress packets, step 401, to other customer edge routers. As described above, the ability to compress packets is announced by adding data to a routing protocol packet, where the added data represents the ability. The customer edge router 110 (i.e., its compression signaling process 140-2) then receives an announcement of an ability to compress packets from another customer edge router in the network, step 402. As with the ability announced by the customer edge router 110, the received announcement is also represented by an addition to a routing protocol packet, such as those described above.

The compression signaling process 140-2 of the customer edge router 110 next matches a compression technique with whatever another customer edge router the customer edge router 110 decides to attempt a match with, step 403. The way in which the compression signaling process 140-2 matches a compression technique depends on whether the customer edge router 110 receives or transmits compression information through its compression signaling process 140-2. The second situation (i.e., the customer edge router 110 transmits compression information) is described in greater detail with regards to FIG. 6 below. The first situation requires that the customer edge router 110 receives compression information from the another customer edge router in a routing protocol packet, step 404. The compression information received from the another customer edge router identifies a plurality of compression techniques, step 407. The plurality of compression techniques, in an example embodiment, include IP Compression Protocol (described in detail in RFC 3545), IP Payload Compression Protocol (described in detail in RFC 3173), and IP Payload Compression Using LZS (described in detail in RFC 2395). Of course, other compression techniques, such as but not limited to proprietary or other public compression techniques, may also be used. The compression signaling process 140-2 then determines, step 405, that any two or more of the identified plurality of compression techniques match any compression techniques the customer edge router is programmed to use, step 408. The compression signaling process 140-2 selects a matched compression technique from any of the matched compression techniques, step 409. As described above, the plurality of compression techniques may include any type of compression algorithm that a customer edge router, such as the customer edge router 110, is able to use to compress (and decompress) data. Finally, the compression signaling process 140-2 flags packets transmitted from and received by the customer edge router 110 to be compressed and decompressed according to the selected matched compression technique, step 406. In this way, customer edge routers are not limited to a single compression technique when transmitting and receiving data from other customer edge routers, creating greater flexibility and potentially increased security.

FIGS. 5 and 6 show how the customer edge router 110 signals compression information through a routing protocol when the compression signaling process 140-2 of the customer edge router 110 transmits the compression information, instead of receiving it (which is described in connection with FIGS. 3 and 4). FIG. 5 correlates to FIG. 3, in that the matching of a single compression technique is described. FIG. 6 correlates to FIG. 4, in that the selection of a single compression technique, from among the matching of at least two compression techniques, is detailed.

The initial steps shown in FIG. 5 are thus the same as described above with regards to FIG. 3. In other words, in FIG. 5, the compression signaling process 140-2 allows the customer edge router 110 to announce, to other customer edge routers, an ability to compress packets, step 501. The ability to compress packets is announced by adding data to a routing protocol packet, such that the added data represents the ability. The compression signaling process 140-2 of the customer edge router 110 then receives an announcement of an ability to compress packets from another customer edge router in the network, step 502. The received announcement is also represented by an addition to a routing protocol packet, such as those described above. The compression signaling process 140-2 next matches a compression technique with whatever another customer edge router the customer edge router 110 decides to attempt to match with, step 503. It is at this point that FIG. 5 diverges from the path described above in regards to FIG. 3.

With respect to FIG. 5, the second scenario referred to above in the discussion of FIG. 3 will be described. That is, the customer edge router 110 initiates the matching through its compression signaling process 140-2, instead of receiving compression information from another customer edge router. In contrast, here the compression signaling process 140-2 transmits compression information to the another customer edge router in a routing protocol packet, step 504. As before, the compression information identifies a compression technique. The compression information may identify a plurality of compression techniques (see description of FIG. 4 above and FIG. 6 below), but for this purpose, it is sufficient that the compression information identifies only one compression technique. The identified compression technique may be any of those listed above, or another compression technique not mentioned herein.

After the customer edge router 110 transmits compression information in a routing protocol packet, the another customer edge router receives the routing protocol packet. The another customer edge router will then determine that a compression technique identified in the compression information of the routing protocol packet matches any compression technique the another customer edge router is programmed to use. In other words, the another customer edge router and its own compression signaling process 140-2 perform the same steps when receiving compression information in a routing protocol packet as the customer edge router 110 does when it receives compression information (i.e., these steps are described above with regards to FIG. 3).

Finally, once a match is determined, the compression signaling process 140-2 of the customer edge router 110 flags packets transmitted from and received by the customer edge router 110 to be compressed and decompressed according to the matched compression technique, step 506. The customer edge router 110 (i.e., its compression signaling process 140-2) knows the matched compression technique by receiving compressed data from an another customer edge router that the customer edge router 110 transmitted compression information to. The customer edge router 110, of course, knows the types of compression techniques it is capable of using, and what technique the compression signaling process 140-2 identified when the process 140-2 transmitted compression information. Thus, upon the initial receipt of a compressed packet, the customer edge router knows it must be compressed according to a compression technique identified in the transmitted compression information. The customer edge router 110 attempts to use each compression technique that was identified in the transmitted compression information to decompress the packet. Whichever technique succeeds is the matched technique selected by the another customer edge router, and the customer edge router 110 has its compression signaling process 140-2 update the FIB table, or equivalent structure, accordingly.

In FIG. 6, the compression signaling process 140-2 repeats the same process as shown in FIG. 5 with small variations, namely that a plurality of compression techniques are signaled through a routing protocol, and the compression signaling process 140-2 selects a particular technique from that plurality. Any type of selection process may be used. For example, each customer edge router 110 may store a table listing each type of compression algorithm it is programmed to use. The table may also include a ranking of those algorithm(s) according to a pre-determined priority. In one embodiment, the algorithm that has the highest priority is tried first, the algorithm with the second highest priority is tried second, and so on. Alternatively, there may be no particular priority assigned to any algorithm, and the algorithm may be selected at random. All that is required is that both the customer edge router 110 and the another customer edge router are each programmed to use that algorithm. As in FIG. 5, the customer edge router 110 announces, to other customer edge routers, an ability to compress packets, step 601, through its compression signaling process 140-2. The ability to compress packets is announced by adding data to a routing protocol packet, depending on the type of routing protocol being used, as described above. The customer edge router 110 then receives an announcement of an ability to compress packets from another customer edge router in the network, step 602, through its compression signaling process 140-2. As with the ability announced by the customer edge router 110, the received announcement is also an addition to a routing protocol packet. The addition to the packet is again dependent on what type of routing protocol is being used. The compression signaling process 140-2 next matches a compression technique with whatever another customer edge router the customer edge router 110 decides to attempt a match with, step 603. Here, as in FIG. 5, the customer edge router 110, through its compression signaling process 140-2, transmits compression information to the another customer edge router in a routing protocol packet. Unlike in FIG. 5, however, here the transmitted compression information identifies a plurality of compression techniques, step 604. The another customer edge router receives the routing protocol packet, and determines that any of the plurality of compression techniques identified in the compression information of the routing protocol packet matches any compression technique the another customer edge router is programmed to use. The another customer edge router then selects a matched compression technique from any of the matched compression techniques, step 606. In other words, the another customer edge router performs the same steps when receiving compression information signaled through a routing protocol that the customer edge router 110 performs when it receives compression information signaled through a routing protocol. As described above, the plurality of compression techniques may include any type of compression algorithm that a customer edge router, such as the customer edge router 110, is able to use to compress (and decompress) data. Finally, the compression signaling process 140-2 flags packets transmitted from and received by the customer edge router 110 to be compressed and decompressed according to the selected matched compression technique, step 606. The compression technique used is identified as described above with respect to step 506 of FIG. 5.

In FIGS. 7-10, the compression signaling process 140-2 needs to attempt another match of a compression technique that is signaled through a routing protocol used by the customer edge router. Two distinction scenarios may occur for each type of matching; that is, (1) a new match may be successful when the customer edge router 110 receives compression information, or (2) the new match may fail, and (3) a new match may be successful when the customer edge router 110 transmits compression information, or (4) that new match may fail. In the embodiments described below, the compression signaling process 140-2 automatically initiates a re-match if any issues arise with the current matched compression technique. In other embodiments, a user may need to take action in order for a re-match to occur. For example, a customer edge router such as the customer edge router 110 may include multiple compression techniques, as described above, and some or all of these techniques may be announced by the compression signaling process 140-2 upon its initiation. If all of the techniques are announced by the compression signaling process 140-2, and due to any of the issues raised below, no matching compression techniques are available at any suitable other customer edge routers, a user may need to install or otherwise add one or more other compression techniques to the customer edge router 110, or to another customer edge router. When a user does so, that customer edge router must be shut down, or otherwise taken off-line, and then re-started, or otherwise brought back on-line. Upon re-start and/or upon being brought back on-line, the compression signaling application 140-1 may automatically execute as the compression signaling process 140-2. The compression signaling process 140-2 will then perform as described above, and thus may effectively re-match with another customer edge router by following the procedures described above.

Figure 7:
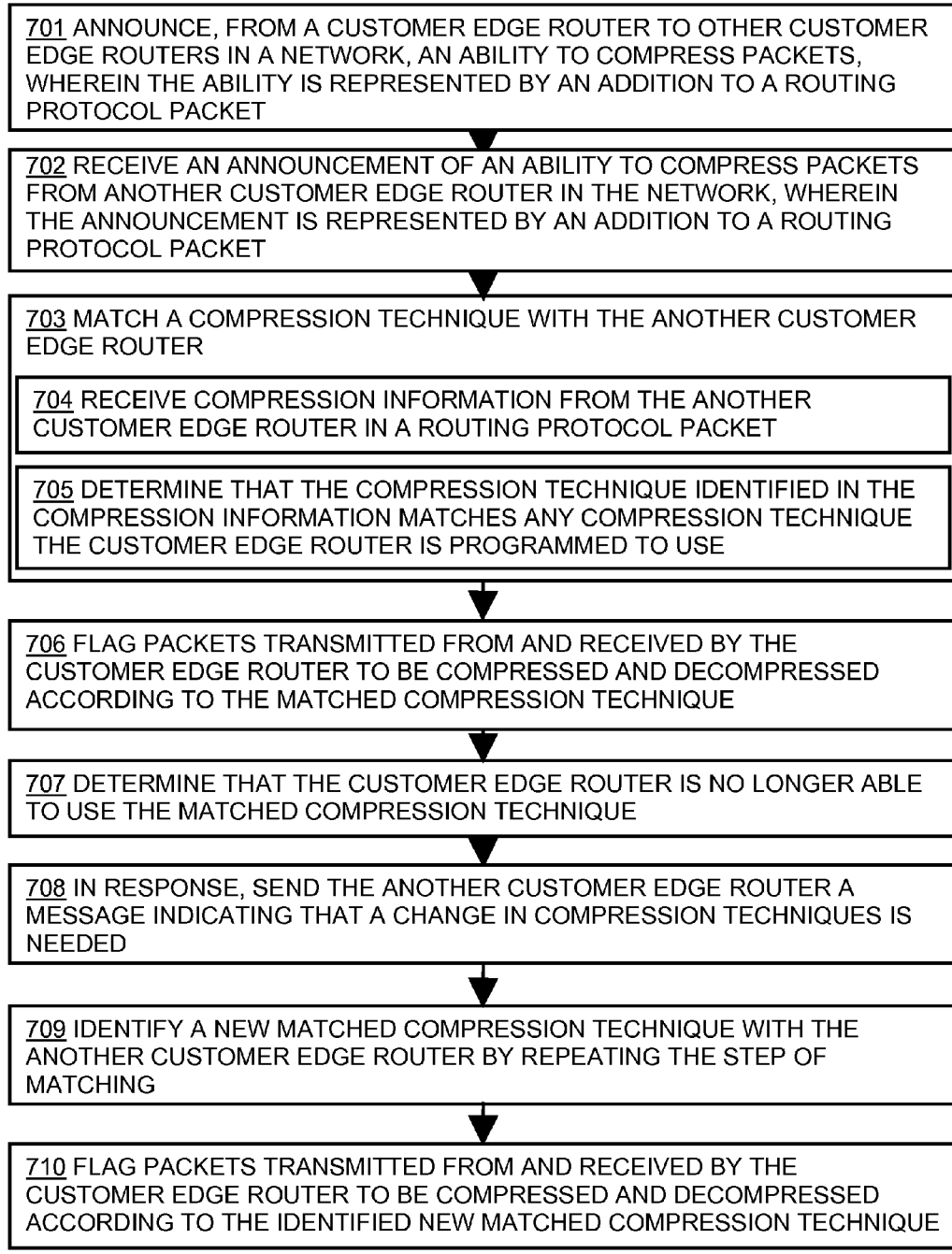

FIG. 7 addresses when the new match is successful and the customer edge router 110 receives compression information. FIG. 9 addresses when the new match is successful and the customer edge router 110 transmits compression information. In each of these scenarios, the customer edge router 110 and compression signaling process 140-2 operate as described above to establish a compression technique through a signaling protocol. That is, through the compression signaling process 140-2, the customer edge router 110 announces, to other customer edge routers, an ability to compress packets, step 701/901. The ability to compress packets is announced by adding data to a routing protocol packet, as described above. The customer edge router 110, through the compression signaling process 140-2, then receives an announcement of an ability to compress packets from another customer edge router in the network, step 702/902, which is also an addition to a routing protocol packet, such as those described above. The compression signaling process 140-2 next matches a compression technique with whatever another customer edge router the customer edge router 110 decides to attempt a match with, step 703/903. Here, the two different processes diverge.

When the customer edge router 110 receives compression information from the another customer edge router in a routing protocol packet, step 704, the compression signaling process 140-2 determines if a compression technique identified in the compression information matches any compression technique the customer edge router is programmed to use, step 705. The compression signaling process 140-2 then flags packets transmitted from and received by the customer edge router 110 to be compressed and decompressed according to the matched compression technique, step 706. With the compression technique agreed upon, customer edge routers may transmit compressed data back and forth according to the agreed upon compression technique. At some point, however, one of the customer edge routers may no longer be able to use the matched compression technique. For example, one of the software or hardware modules that allows that customer edge router to use that compression technique may fail, or may need to be removed for repairs or an upgrade, or may simply need to be taken off-line for any reason. Alternatively, a maintainer of that customer edge router may decide to no longer provide support for that particular compression technique, for any of a number of reasons. Regardless of the particular reason, the customer edge router ceases to support that compression technique, even if for only a short amount of time. The compression signaling process 140-2 may determine that the customer edge router 110 is no longer able to use the match compression technique, step 707. For example, in an embodiment where any compression technique the customer edge router 110 is programmed to use is listed in a table stored in the customer edge router 110, if the customer edge router 110 is no longer able to use a particular technique, the entry in the table corresponding to that technique may be removed. The compression signaling process 140-2 may then determine that the customer edge router 110 is no longer able to use the match compression technique by accessing the table and seeing the match compression technique no longer listed. Alternatively, the compression signaling process 140-2 may receive communication from another process that performs the compression and decompression of data that is no longer able to do so. The process of determining is no so limited to these two examples and may include any other process of determining that a compression technique is no longer available. In response to this determination, the compression signaling process 140-2 sends the another customer edge router a message indicating that a change in compression techniques is needed, step 708. The compression signaling process 140-2 then identifies a new matched compression technique with the another customer edge router by repeating the step of matching, step 709. Upon a successful new match being identified, the compression signaling process 140-2 flags packets transmitted from and received by the customer edge router to be compressed and decompressed according to the identified new matched compression technique, step 710.

Alternatively, when the customer edge router 110 transmits compression information in a routing protocol packet, step 904, the compression information identifies a compression technique. The another customer edge router receives the routing protocol packet and determines that a compression technique identified in the compression information of the routing protocol packet matches any compression technique the another customer edge router is programmed to use. The compression signaling process 140-2 then flags packets transmitted from and received by the customer edge router 110 to be compressed and decompressed according to the matched compression technique, step 906. Then, for any of the reasons described above or any other reason(s), the matched compression technique may no longer be usable by the another customer edge router. The customer edge router 110 then receives a message from the another customer edge router indicating that a change in compression techniques is needed, step 908. The compression signaling process 140-2 then identifies a new matched compression technique with the another customer edge router by repeating the step of matching, step 909. Upon a successful new match being identified, the compression signaling process 140-2 flags packets transmitted from and received by the customer edge router to be compressed and decompressed according to the identified new matched compression technique, step 910.

Figure 8:
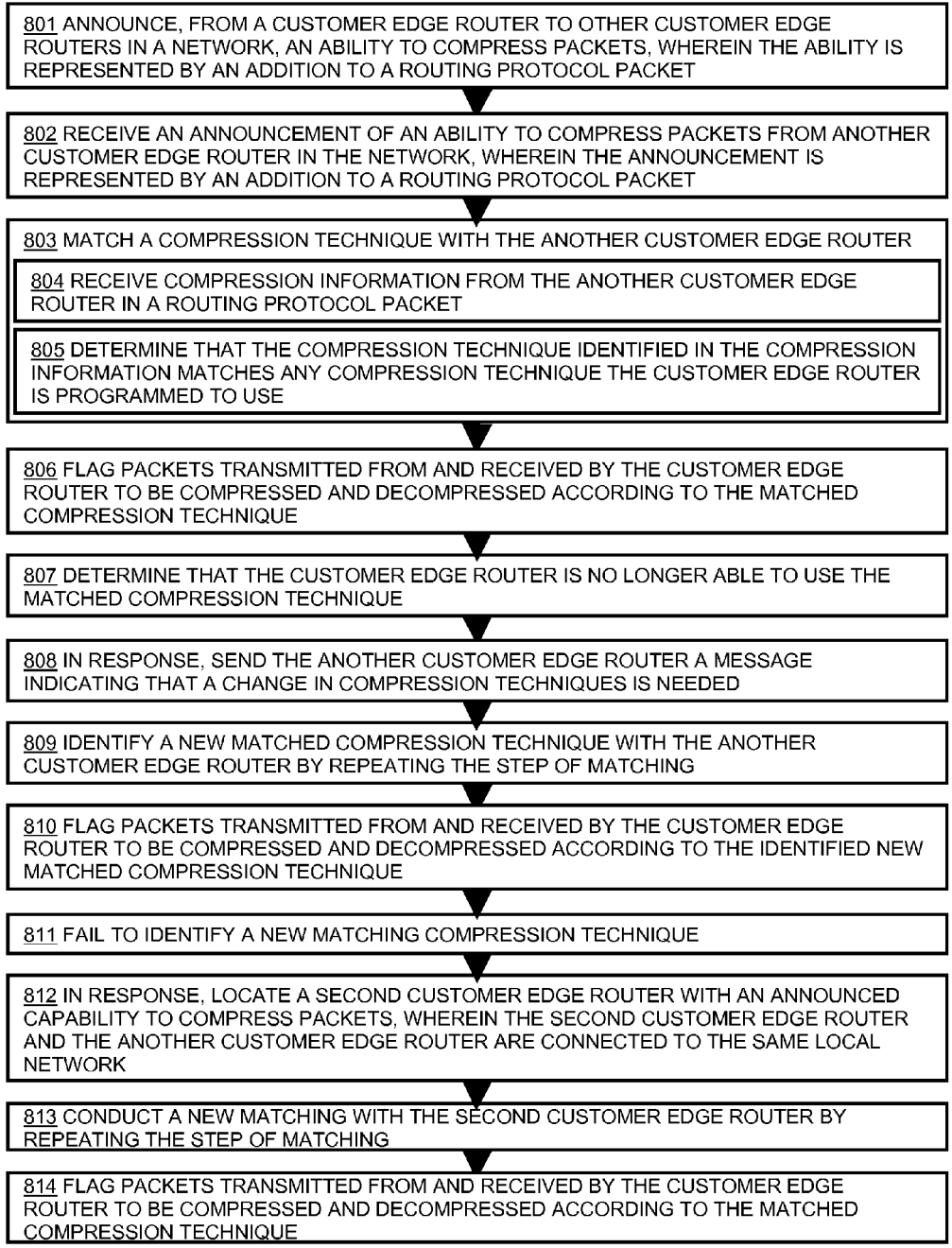
Figure 10:
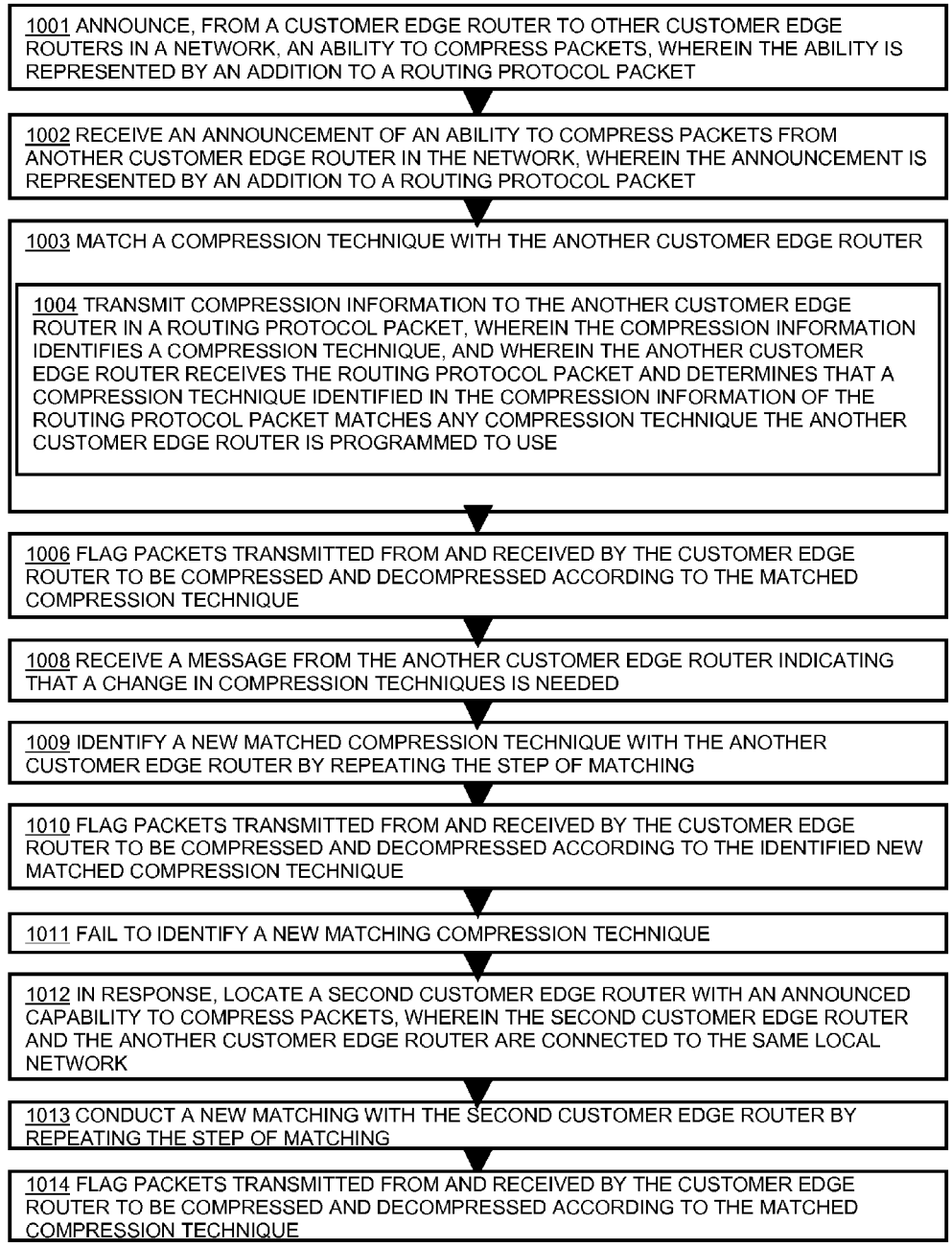

The above two scenarios presume that the next attempt at matching is successful. It is possible that the matching attempt will not succeed, however. For example, if the customer edge router no longer supports any type of compression technique, there is no way for the compression signaling process 140-2 to match a compression technique. Alternatively, if the customer edge routers no longer both support at least one of the same techniques, there is no way for the compression signaling process 140-2 to match a compression technique. It is still possible to maintain compressed transmissions between the networks of which the customer edge routers are a part, as is shown in FIG. 8 (where the customer edge router 110 receives compression information) and 10 (where the customer edge router 110 transmits compression information).

First, steps 801-810, which correspond to steps 701-710 described above, and steps 1001-1010, which correspond to steps 901-910 described above, are repeated. If the attempt at a new match fails, that is, the compression signaling processes 140-2 fail to identify a new matching compression technique, step 811/1011, in response, the compression signaling process 140-2 locates a second customer edge router with an announced capability to compress packets from another customer edge router in the network, wherein the second customer edge router and the another customer edge router are connected to the same local network, step 812/1012. The compression signaling process 140-2 would then conduct a new matching with the second customer edge router by repeating the step of negotiating, step 813/1013. Finally, the compression signaling process 140-2 would flag packets transmitted from and received by the customer edge router to be compressed and decompressed according to the matched compression technique, step 814/1014. As soon as this is completed, transmission of compressed data between the networks may resume over the customer edge routers involved in the new matching.

In FIG. 11, the compression signaling process 140-2 must address a situation where the routing protocol used between provider edge routers differs from the routing protocol used between a customer edge router and a provider edge router. Thus, as described above in connection with FIG. 2, the customer edge router communicates with other customer edge routers through a provider edge router and a provider network.

Through the compression signaling process 140-2, the customer edge router 110 announces, to other customer edge routers, an ability to compress packets, step 1101. The customer edge router 110, through the compression signaling process 140-2, then receives an announcement of an ability to compress packets from another customer edge router in the network, step 1102. The ability to compress packets is announced by adding data to a routing protocol packet, as described above.

The compression signaling process 140-2 next matches a compression technique with whatever another customer edge router the customer edge router 110 decides to attempt a match with, step 1103. The customer edge router 110 receives compression information from the another customer edge router in a routing protocol packet, step 1104, and then the compression signaling process 140-2 determines that a compression technique identified in the compression information matches any compression technique the customer edge router is programmed to use, step 1104. (Of course, this same process may be repeated when the compression signaling process 140-2 transmits compression information instead of receiving it.) As described above, the compression technique may be any type of compression algorithm that a customer edge router, such as the customer edge router 110, is able to use to compress (and decompress) data. The compression signaling process 140-2 flags packets transmitted from and received by the customer edge router 110 to be compressed and decompressed according to the matched compression technique, step 1106.

The compression signaling process 140-2 may then detect a customer edge-provider edge routing protocol used for transmissions between the customer edge router and a corresponding provider edge router, step 1107. If the customer edge-provider edge routing protocol detected by the compression signaling process 140-2 differs from a provider edge-provider edge routing protocol used for transmissions between provider edge routers, the compression signaling process 140-2 performs two steps for each customer edge router involved, step 1108. First, the compression signaling process 140-2 extends any compression information from the customer edge-provider edge routing protocol for use by the provider edge-provider edge routing protocol. Second, the compression signaling process 140-2 extracts any compression information from the provider edge-provider edge routing protocol for use by the customer edge-provider edge routing protocol. This allows the functionality of the compression signaling process 140-2 to be extended regardless of the type of protocol used for transmissions between provider edge routers.

In FIG. 12, the customer edge routers perform compression only on a class of packets that is identified through a routing protocol by the compression signaling process 140-2. A class of packets is a grouping of packets according to one or more particular characteristics. For example, a class of packets may be defined to include all packets that originated from a particular network address. In another example, a class of packets may be defined to include all packets that contain data of a particular type, such as audio or video data. Through the compression signaling process 140-2, the customer edge router 110 announces, to other customer edge routers, an ability to compress packets, step 1201. The ability to compress packets is announced by adding data to a routing protocol packet, as described above. The customer edge router 110, through the compression signaling process 140-2, then receives an announcement of an ability to compress packets from another customer edge router in the network, step 1202. As with the ability announced by the customer edge router 110, the received announcement is also an addition to a routing protocol packet, such as those described above.

The compression signaling process 140-2 next matches a compression technique with whatever another customer edge router the customer edge router 110 decides to attempt a match with, step 1203. The customer edge router 110 receives compression information from the another customer edge router in a routing protocol packet, step 1204, and the compression signaling process 140-2 determines if a compression technique identified in the compression information matches any compression technique the customer edge router is programmed to use, step 1205. (Of course, this process may be repeated when the compression signaling process 140-2 transmits compression information instead of receives it.) Then, the compression signaling process 140-2 flags packets transmitted from and received by the customer edge router, that are also in the identified class of packets, to be compressed and decompressed according to the matched compression technique, step 1207.

Note that, in regards to the usage of OSPF described herein, an alternative is to have the compression signaling process 140-2 use a Link-Scope Opaque link-state advertisement (LSA) to carry the CAS-TLV. The remaining usage is otherwise unchanged. Note further that a very similar protocol extension may be made to other Interior Gateway Protocols (IGPs), such as Intermediate System-Intermediate System (ISIS) and Enhanced Interior Gateway Routing Protocol (EIGRP).

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    announcing, in a first routing protocol packet transmitted from a first customer edge router to at least a second customer edge router in a network, an ability to compress payloads of packets;
    receiving compression information from the second customer edge router in a second routing protocol packet, the compression information identifying a compression technique supported by the second customer edge router, wherein the first and second routing protocol packets are BGP (border gateway protocol) packets;
    determining a matched compression technique by determining whether the compression technique identified in the compression information matches any compression technique supported by the first customer edge router;
    identifying, in a routing table at the first customer edge router, the matched compression technique as applicable to routes that include the second customer edge router; and
    flagging, based on the routes identified in the routing table, packets transmitted from the first customer edge router to the second customer edge router for compression of payloads, but not headers, of the packets in accordance with the matched compression technique.

2. The method of claim 1 wherein:
    the compression information identifies a plurality of compression techniques supported by the second customer edge router; and
    determining the matched compression technique further comprises:
    determining that any two or more of the identified plurality of compression techniques match any compression techniques supported by the first customer edge router; and
    selecting the matched compression technique from any of the matched compression techniques.

3. The method of claim 1 further comprising:
    transmitting compression information in the first routing protocol packet to the second customer edge router, wherein the compression information in the first routing protocol packet identifies at least one compression technique supported by the first customer edge router, and wherein the second customer edge router receives the first routing protocol packet and determines that the at least one compression technique identified in the compression information in the first routing protocol packet matches any compression technique supported by the second customer edge router.

4. The method of claim 3 wherein the compression information in the first routing protocol packet identifies a plurality of compression techniques, and wherein the second customer edge router receives the first routing protocol packet, determines that any of the plurality of compression techniques identified in the compression information of the first routing protocol packet matches any compression technique the second customer edge router is programmed to use, and selects the matched compression technique from any of the matched compression techniques.

5. The method of claim 3 further comprising:
    receiving a message from the second customer edge router indicating that a change in compression techniques is needed;
    identifying a new matched compression technique with the second customer edge router by repeating an exchange of compression technique information in routing protocol packets; and
    flagging packets transmitted from and received by the first customer edge router to be compressed and decompressed according to the new matched compression technique.

6. The method of claim 5 further comprising:
    failing to identify a new matching compression technique;
    in response, locating a third customer edge router with an announced capability to compress packets, wherein the third customer edge router and the second customer edge router are connected to the same local network;
    conducting a new matching with the third customer edge router by repeating the step of matching; and
    flagging packets transmitted from and received by the first customer edge router to be compressed and decompressed according to the matched compression technique.

7. The method of claim 1 further comprising:
    determining that the first customer edge router is no longer able to use the matched compression technique;
    in response, sending the second customer edge router a message indicating that a change in compression techniques is needed;
    identifying a new matched compression technique with the second customer edge router by exchanging compression technique information in routing protocol packets; and
    flagging packets transmitted from and received by the first customer edge router to be compressed and decompressed according to the new matched compression technique.

8. The method of claim 7 further comprising:
    failing to identify a new matching compression technique;
    in response, locating a third customer edge router with an announced capability to compress packets, wherein the third customer edge router and the second customer edge router are connected to the same local network;
    conducting a new matching with the third customer edge router by repeating an exchange of compression technique information in routing protocol packets; and
    flagging packets transmitted from and received by the first customer edge router to be compressed and decompressed according to the matched compression technique.

9. The method of claim 1 wherein the first customer edge router communicates with at least the second customer edge router through a provider edge router and a provider network, the method comprising:
  detecting a customer edge-provider edge routing protocol used for transmissions between the customer edge router and the provider edge router; and
  if the detected customer edge-provider edge routing protocol differs from a provider edge-provider edge routing protocol used for transmissions between provider edge routers, extending any compression information from the customer edge-provider edge routing protocol for use by the provider edge-provider edge routing protocol and extracting any compression information from the provider edge-provider edge routing protocol for use by the customer edge-provider edge routing protocol.

10. The method of claim 1 wherein the compression information identifies the compression technique and a class of packets to which the compression technique is to be applied; and wherein flagging comprises:
  flagging packets transmitted from and received by the first customer edge router, that are in the identified class of packets, to be compressed and decompressed according to the matched compression technique.

11. A first customer edge router comprising:
  a network interface;
  a memory system encoded with a compression signaling application; and a processor capable of executing the compression signaling application to provide a compression signaling process that performs operations of:
  negotiating a matched compression technique between the first customer edge router and a second customer edge router by exchanging routing protocol packets between the first customer edge router and the second customer edge router, the matched compression technique being identified in one of the routing protocol packets transmitted between the first customer edge router and the second customer edge router, the matched compression technique being supported by both the first customer edge router and the second customer edge router, wherein the routing protocol packets are BGP (border gateway protocol) packets;
  installing the matched compression technique in a FIB (forwarding information base) table for routes that include the second customer edge router; and
  flagging, based on the routes for which the matched compression technique is installed, packets transmitted from and received by the first customer edge router, the transmitted packets being flagged for compression of only payloads in accordance with the matched compression technique, the received packets being flagged for decompression of only payloads in accordance with the matched compression technique.

12. The first customer edge router of claim 11 wherein negotiating the matched compression technique comprises:
  announcing an ability to compress payloads of packets in a first routing protocol packet transmitted from the first customer edge router to at least the second customer edge router;
  receiving compression information in a second routing protocol packet from the second customer edge router, the compression information identifying a plurality of compression techniques supported by the second customer edge router;
  determining that at least two of the identified plurality of compression techniques match compression techniques supported by the first customer edge router; and
  selecting the matched compression technique from the at least two of the identified plurality of compression techniques.

13. The first customer edge router of claim 11 wherein negotiating the matched compression technique further comprises:
  transmitting compression information in a first routing protocol packet to the second customer edge router, the compression information in the first routing protocol packet identifying at least one compression technique supported by the first customer edge router;
  receiving the first routing protocol packet at the second customer edge router;
  determining the matched compression technique by determining that the at least one compression technique identified in the compression information in the first routing protocol packet matches any compression technique supported by the second customer edge router; and
  receiving the matched compression technique at the first customer edge router in a second routing protocol packet transmitted from the second customer edge router.

14. The first customer edge router of claim 13 wherein the second customer edge router determines that a plurality of compression techniques identified in the compression information of the first routing protocol packet match compression techniques supported by the second customer edge router, and wherein the second customer edge router selects the matched compression technique from any of the plurality of compression techniques.

15. The first customer edge router of claim 11 wherein the compression signaling process further performs operations of:
  in response to a determination that the first customer edge router is no longer able to use the matched compression technique, sending the second customer edge router a message indicating that a change in compression techniques is needed;
  negotiating a new matched compression technique with the second customer edge router by exchanging a plurality of routing protocol packets; and
  flagging packets transmitted from and received by the first customer edge router to be compressed and decompressed according to the identified new matched compression technique.

16. A first customer edge router comprising a processor configured to:
  negotiate a matched compression technique between the first customer edge router and a second customer edge router from an exchange of routing protocol packets between the first and second customer edge routers, the matched compression technique being identified in one of the routing protocol packets transmitted between the first customer edge router and the second customer edge router, the matched compression technique being supported by both the first and second customer edge routers, wherein the routing protocol packets are BGP (border gateway protocol) packets;
  install, in the first customer edge router, all routes that include the second customer edge router with the matched compression technique; and
  flag, based on the routes installed with the matched compression technique, packets transmitted from and received by the first customer edge router, the transmitted packets being flagged for compression of only payloads in accordance with the matched compression technique, the received packets being flagged for decompression of only payloads in accordance with the matched compression technique.

17. The first customer edge router of claim 16, wherein, to install the routes with the matched compression technique, the processor is further configured to:
set a compression bit in a routing table on all advertised routes that belong to the first customer edge router; and
signal traffic received from the second customer edge router for decompression on a per route basis determined by the compression bit and then forward as native traffic.

18. The first customer edge router of claim 16 wherein the processor is further configured to:
determine that a plurality of compression techniques are supported by both the first and second customer edge routers from the exchange of routing protocol packets; and
select the matched compression technique from the plurality of compression techniques.

19. The first customer edge router of claim 16 wherein the packets transmitted from and received by the first customer edge router include a destination IP (Internet Protocol) address in uncompressed headers of the packets on any of the routes installed with the matched compression technique.

* * * * *